(12) United States Patent
Myers et al.

(10) Patent No.: US 7,831,473 B2
(45) Date of Patent: Nov. 9, 2010

(54) METHODS, SYSTEMS, AND PRODUCTS FOR CREDITING ACCOUNTS

(75) Inventors: Jerome Myers, Douglasville, GA (US); John Ruckart, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1137 days.

(21) Appl. No.: 11/495,936

(22) Filed: Jul. 29, 2006
(Under 37 CFR 1.47)

(65) Prior Publication Data
US 2008/0043950 A1 Feb. 21, 2008

(51) Int. Cl.
*G06Q 30/00* (2006.01)
*H04M 15/00* (2006.01)

(52) U.S. Cl. ............... 705/14.64; 705/14.4; 705/14.62; 705/14.69; 379/114.13

(58) Field of Classification Search ............. 379/88.11, 379/88.12, 88.13, 88.16, 88.22, 114.01, 114.13, 379/121.01, 121.02, 121.03, 130; 455/405–409, 455/414.1, 550.1; 705/14.1, 14.12, 14.13, 705/14.37, 14.38, 14.4, 14.43
See application file for complete search history.

(56) References Cited

U.S. PATENT DOCUMENTS

| | | | |
|---|---|---|---|
| 5,572,442 A | | 11/1996 | Schulhof et al. |
| 5,794,210 A | * | 8/1998 | Goldhaber et al. ....... 705/14.69 |
| 5,933,811 A | | 8/1999 | Angles et al. |
| 5,970,467 A | * | 10/1999 | Alavi ......................... 705/10 |
| 6,049,779 A | * | 4/2000 | Berkson ................. 705/14.39 |
| 6,070,147 A | * | 5/2000 | Harms et al. ............. 705/14.25 |
| 6,185,545 B1 | | 2/2001 | Resnick et al. |
| 6,212,262 B1 | * | 4/2001 | Kamel ...................... 379/88.22 |
| 6,216,111 B1 | * | 4/2001 | Walker et al. ............. 705/14.13 |
| 6,233,564 B1 | * | 5/2001 | Schulze, Jr. .............. 705/14.19 |
| 6,236,975 B1 | * | 5/2001 | Boe et al. ....................... 705/7 |
| 6,415,142 B1 | | 7/2002 | Martineau |
| 6,446,044 B1 | * | 9/2002 | Luth et al. ................ 705/14.16 |
| 6,457,640 B2 | | 10/2002 | Ramachandran et al. |
| 6,477,509 B1 | | 11/2002 | Hammons et al. |
| 6,633,850 B1 | * | 10/2003 | Gabbard et al. .......... 705/14.66 |
| 6,754,635 B1 | * | 6/2004 | Hamlin et al. ................ 705/10 |
| 6,816,721 B1 | | 11/2004 | Rudisill |
| 6,823,172 B1 | | 11/2004 | Forrest |
| 6,840,444 B2 | | 1/2005 | Pierce et al. |
| 6,889,054 B2 | * | 5/2005 | Himmel et al. .......... 455/456.3 |
| 6,892,387 B1 | | 5/2005 | Lee |
| 6,907,418 B2 | | 6/2005 | Shin et al. |
| 6,934,529 B2 | | 8/2005 | Bagoren et al. |
| 6,934,664 B1 | | 8/2005 | Webb et al. |
| 6,959,285 B2 | | 10/2005 | Stefanik et al. |
| 6,973,476 B1 | | 12/2005 | Naden et al. |
| 7,016,877 B1 | * | 3/2006 | Steele et al. ................... 705/50 |
| 7,440,563 B2 | * | 10/2008 | Baiz Matuk ........... 379/209.01 |
| 2001/0013120 A1 | | 8/2001 | Tsukamoto |
| 2001/0034647 A1 | | 10/2001 | Marks et al. |
| 2001/0037360 A1 | | 11/2001 | Ekkel |
| 2001/0056374 A1 | | 12/2001 | Joao |

(Continued)

*Primary Examiner*—Binh K Tieu
(74) *Attorney, Agent, or Firm*—Scott P. Zimmerman PLLC

(57) ABSTRACT

Methods, systems, and products are disclosed for crediting an account. An advertisement is received, and the advertisement includes an account number that uniquely identifies an account associated with the advertisement. The advertisement is presented at the communications device. A request for credit is sent including the account number and a device number that uniquely identifies the communications device. The request seeks credit for presenting the advertisement.

20 Claims, 7 Drawing Sheets

U.S. PATENT DOCUMENTS

| | | |
|---|---|---|
| 2002/0019774 A1 | 2/2002 | Kanter |
| 2002/0077130 A1* | 6/2002 | Owensby .................... 455/466 |
| 2003/0018525 A1* | 1/2003 | Joao ............................ 705/14 |
| 2003/0033243 A1 | 2/2003 | Baker et al. |
| 2003/0050837 A1* | 3/2003 | Kim ............................ 705/14 |
| 2004/0002359 A1 | 1/2004 | Deas et al. |
| 2004/0054597 A1 | 3/2004 | Gulliver et al. |
| 2004/0088250 A1 | 5/2004 | Bartter et al. |
| 2004/0133511 A1 | 7/2004 | Smith et al. |
| 2004/0162732 A1 | 8/2004 | Rahim et al. |
| 2004/0230489 A1 | 11/2004 | Goldthwaite et al. |
| 2004/0235524 A1 | 11/2004 | Abuhamdeh |
| 2004/0255322 A1 | 12/2004 | Meadows et al. |
| 2005/0061872 A1 | 3/2005 | Paschini et al. |
| 2005/0105704 A1 | 5/2005 | Harrison et al. |
| 2005/0108092 A1 | 5/2005 | Campbell et al. |
| 2005/0165640 A1* | 7/2005 | Kotorov ....................... 705/14 |
| 2007/0067215 A1* | 3/2007 | Agarwal et al. ............... 705/14 |
| 2007/0244752 A1* | 10/2007 | Bayne ......................... 705/14 |
| 2007/0260515 A1* | 11/2007 | Schoen et al. ................. 705/14 |
| 2008/0045195 A1* | 2/2008 | Cortegiano .............. 455/414.3 |
| 2008/0195460 A1* | 8/2008 | Varghese .................... 705/10 |

* cited by examiner

METHODS, SYSTEMS, AND PRODUCTS FOR CREDITING ACCOUNTS

NOTICE OF COPYRIGHT PROTECTION

A portion of this disclosure and its figures contain material subject to copyright protection. The copyright owner has no objection to the facsimile reproduction by anyone of the patent document or the patent disclosure, but otherwise reserves all copyrights whatsoever.

BACKGROUND

This application generally relates to data processing and, more particularly, to incentive or promotion programs that provide compensation.

Consumers are overwhelmed by advertising messages. Anyone with an email account is flooded with promotions for pharmaceutical products, for investment opportunities, and for body enhancements. Many websites contain advertisements, and "pop-up" advertising can occur during offline sessions. Advertisements are even appearing on cell phones and other wireless devices. Most of these advertisements, however, are obtrusive and irrelevant to an individual user. Most users ignore or evade the advertisement message, thus producing an inefficient marketing mechanism. What is needed, then, are methods, systems, and products that provide compensation for viewing, listening to, or otherwise experiencing an advertisement, thus ensuring the advertisement penetrates the clutter.

SUMMARY

The aforementioned problems, and other problems, are reduced, according to exemplary embodiments, using methods, systems, and products that compensate a user for viewing, listening to, or otherwise experiencing an advertisement. When a user's communications device receives an advertisement, exemplary embodiments reward the user for presenting the advertisement on the communications device. The advertisement includes an account number that uniquely identifies an account associated with the advertisement. When the user's communications device processes the advertisement, the user's communications device may then request compensation or credit for presenting the advertisement. Because users are compensated for experiencing the advertisement, an advertiser has greater confidence that the advertisement will penetrate the clutter and not be ignored. Moreover, exemplary embodiments may log processed advertisements and communications devices in a database. Advertisers may query the database to obtain communications devices most likely to respond to an advertising message, thus further helping to target advertisements to an intended user.

The exemplary embodiments describe a method for crediting an account. An advertisement is received, and the advertisement includes an account number that uniquely identifies an account associated with the advertisement. The advertisement is presented at the communications device. A request for credit is sent including the account number and a device number that uniquely identifies the communications device. The request seeks credit for presenting the advertisement.

In another of the embodiments, a system is disclosed for crediting an account. A credit application is stored in memory, and a processor communicates with the memory. The processor receives an advertisement comprising an account number that uniquely identifies an account associated with the advertisement. The processor audibly and/or visually presents the advertisement at the communications device. The processor then sends a request for credit comprising the account number and a device number that uniquely identifies the communications device. The request seeks credit for presenting the advertisement.

In yet another embodiment, a computer program product is also disclosed for crediting an account. The computer program product stores computer code for receiving an advertisement. The advertisement includes an account number that uniquely identifies an account associated with the advertisement. The advertisement is presented at the communications device. A request for credit is sent including the account number and a device number that uniquely identifies the communications device. The request seeks credit for presenting the advertisement.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

Figure 1:
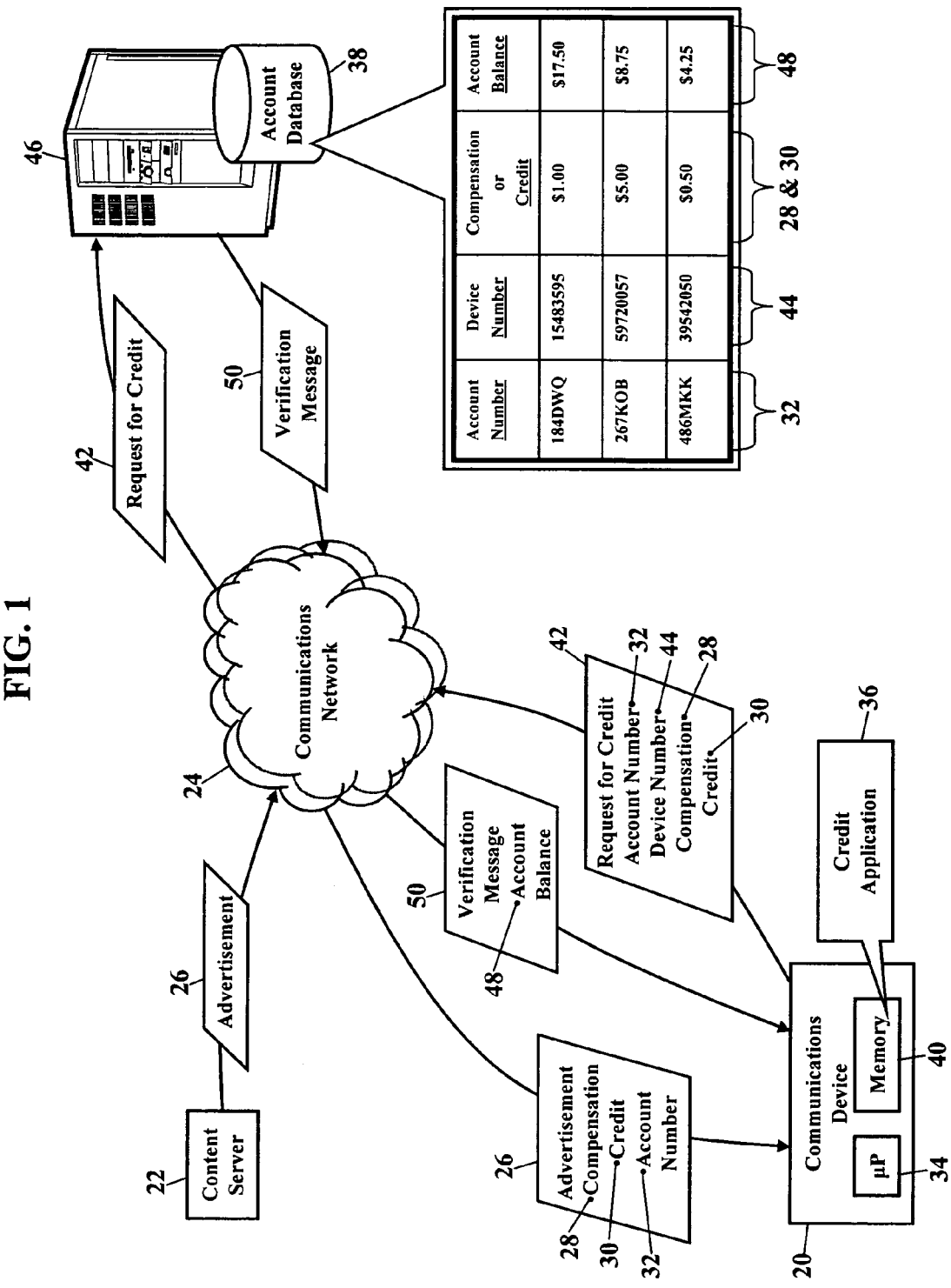
FIG. 1 is a simplified schematic illustrating a network environment in which exemplary embodiments may be implemented.

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

FIG. 1 is a simplified schematic illustrating a network environment in which exemplary embodiments may be implemented. A user's communications device 20 communicates with a content server 22 via a communications network 24. Although the user's communications device 20 is generically shown, the communications device 20, as will be later explained, may be any computer, personal digital assistant, cordless/cellular/IP phone, or any other processor-controlled device. The content server 22 sends a communication, such as an electronic advertisement 26, to the user's communications device 20. The advertisement 26 seeks to promote any product or service offered by an advertiser. Moreover, the advertisement 26 offers compensation 28 for viewing, listening to, or otherwise experiencing the advertisement 26. The advertisement 26, for example, offers a credit 30 to an account number 32 when the advertisement 26 is audibly and/or visually presented at the user's communications device 20. The account number 32 uniquely identifies an account associated with the advertisement 26. The account number 32 may be any alphanumeric identifier or code that uniquely identifies the account to which the compensation 28 or credit 30 is applied. The account number 32, for example, may uniquely identify the user's cellular service account or other wireless/wired service account, Internet Service Provider account, credit card account, cable service account, electric, water, or other utility service account. The account number 32 may also uniquely identify a rewards account offered by a hotel chain, car rental operator, or a financial institution (such as a credit card rewards program). The account number 32 may also uniquely identify a rewards account offered by a merchant or retailer of goods and/or services. While the drawings and this disclosure are directed towards advertisements, it should be appreciated that the invention is applicable to any communication or content that rewards a user for listening to, or for viewing, the communication or content.

The user's communications device 20 receives the advertisement 26. A processor ("µP") 34, ASIC, or other device visually and/or audibly processes the advertisement 26. When the advertisement 26 is viewed or listened to by the user, a credit application 36 initiates communication with an account database 38. The credit application 36 is a set of processor-executable instructions that are stored in memory 40 of the user's communications device 20. The credit application 36 is a software engine that instructs the processor 34 to send a request 42 for credit to the account database 38. The request 42 for credit may include the account number 32, the compensation 28 or the credit 30, and a device number 44. The account number 32 uniquely identifies an account associated with the advertisement 26. The device number 44 uniquely identifies the user's communications device to which the compensation 28 or credit 30 is applied. The device number 44 is any alphanumeric identifier or code that uniquely identifies the user's communications device 20. Because the advertisement 26 offers the compensation 28 and/or credit 30 for viewing or listening to the advertisement 26, the request 42 for credit seeks to have the compensation 28 and/or credit 30 applied to the device number 44. Here, then, the credit 30 (monetary credit, a service credit, or reward points/credits) may be device-specific, in that the credit 30 is redeemable only using the unique device number 44.

The account database 38 receives the request 42 for credit. The account database 38 compensates the user's communications device 20 for processing (e.g., displaying) the advertisement 26. The account database 38 may additionally or alternatively compensate the user or an account associated with the user. The account database 38 may additionally or alternatively prompt the user to specify which of several communications devices or accounts shall be credited with the compensation. The account database 38 is stored in the memory of an account server 46. The account database 38 associates the account number 32 and the compensation 28 or the credit 30 with the device number 44. The account database 38 tallies an account balance 48 for each account number associated with the device number 44. When the account database 38 compensates the account number 32 with the compensation 28 or the credit 30, the account database 38 may send a verification message 50. The verification message 50 verifies that a credit has been added to the account number 32 associated with the device number 44. The verification message 50 may include the account balance 48.

The user's communications device 20 receives the verification message 50. The credit application 36 may inspect the verification message 50 to ensure compensation was received for viewing or listening to the advertisement 26. If compensation was not received, the credit application 36 may attempt to send a second, redundant request 42 for credit. The credit application 36 may also instruct the processor 34 to display the account balance 48. The credit application 36 may also instruct the processor 34 to store the account balance 48 in the memory 40. The user may thus retrieve the account balance 48 and, at any time, review balances for any accounts associated with the communications device 20 (e.g., the device number 44). The credit application 36 may also compare the account balance 48 before the request 42 for credit is sent with the account balance 48 after the verification message 50 is received. If any difference equals the requested credit or compensation, then the credit application 36 knows credit was received and properly posted to the account number 32. If a discrepancy exists, then compensation was not properly posted and second, redundant request 42 for credit may be desired.

Exemplary embodiments thus compensate the user for experiencing the advertisement. The account number 32 and/or the device number 44 are automatically collected and associated in the account database 38. Because the user is compensated for experiencing the advertisement, an advertiser has greater confidence that the user will not ignore the advertisement 26. Moreover, users are more likely to only view advertisements that are relevant to their interests. No doubt a small number of users will accept compensation for any advertisement, regardless of its targeted audience, message, or content. As later paragraphs will explain, however, the account database 38 may be used to filter or "weed out" indiscriminate recipients, thus further helping to target advertisements to an intended user.

Exemplary embodiments may be applied regardless of networking environment. The user's communications device 20 and the content server 22 may operate using wired or wireless principles. The communications network 24 may be a cable network operating in the radio-frequency domain and/or the Internet Protocol (IP) domain. The communications network 24 may have POTS components and/or features. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network or communications device, regardless of physical componentry, physical configuration, or communications standard(s).

The users' communications device 20, the content server 22, and the account server 46 are only simply illustrated. Because the architecture and operating principles of computers, servers, communications devices, and other processor-controlled devices are well known, the hardware and software components are not further shown and described. If, however, the reader desires more details, the reader is invited to consult the following sources, all incorporated herein by reference in their entirety: ANDREW TANENBAUM, COMPUTER NETWORKS (4$^{th}$ edition 2003); WILLIAM STALLINGS, COMPUTER ORGANIZATION AND ARCHITECTURE: DESIGNING FOR PERFORMANCE (7$^{th}$ Ed., 2005); and DAVID A. PATTERSON & JOHN L. HENNESSY, COMPUTER ORGANIZATION AND DESIGN: THE HARDWARE/SOFTWARE INTERFACE (3$^{rd}$. Edition 2004).

Additionally, some aspects of advertisement compensation are known, so this disclosure does not greatly explain the known details. If the reader desires more details, the reader is invited to consult the following sources, all incorporated herein by reference in their entirety: U.S. Pat. No. 5,794,210 to Goldhaber et al. (Aug. 11, 1998); U.S. Pat. No. 5,933,811 to Angles et al. (Aug. 3, 1999); U.S. Pat. No. 6,477,509 to Hammons et al. (Nov. 5, 2002); U.S. Pat. No. 6,892,387 to Lee (May 10, 2005); U.S. Pat. No. 6,907,418 to Shin et al. (Jun. 14, 2005); Published U.S. Patent Application 2001/0034647 to Marks et al. (Oct. 25, 2001); Published U.S. Patent Application 2001/0056374 to Joao (Dec. 27, 2001); Published U.S. Patent Application 2002/0019774 to Kanter (Feb. 14, 2002); Published U.S. Patent Application 2004/0255322 to Meadows et al. (Dec. 16, 2004); and Published U.S. Patent Application 2005/0108092 to Campbell et al. (May 19, 2005).

Figure 2:
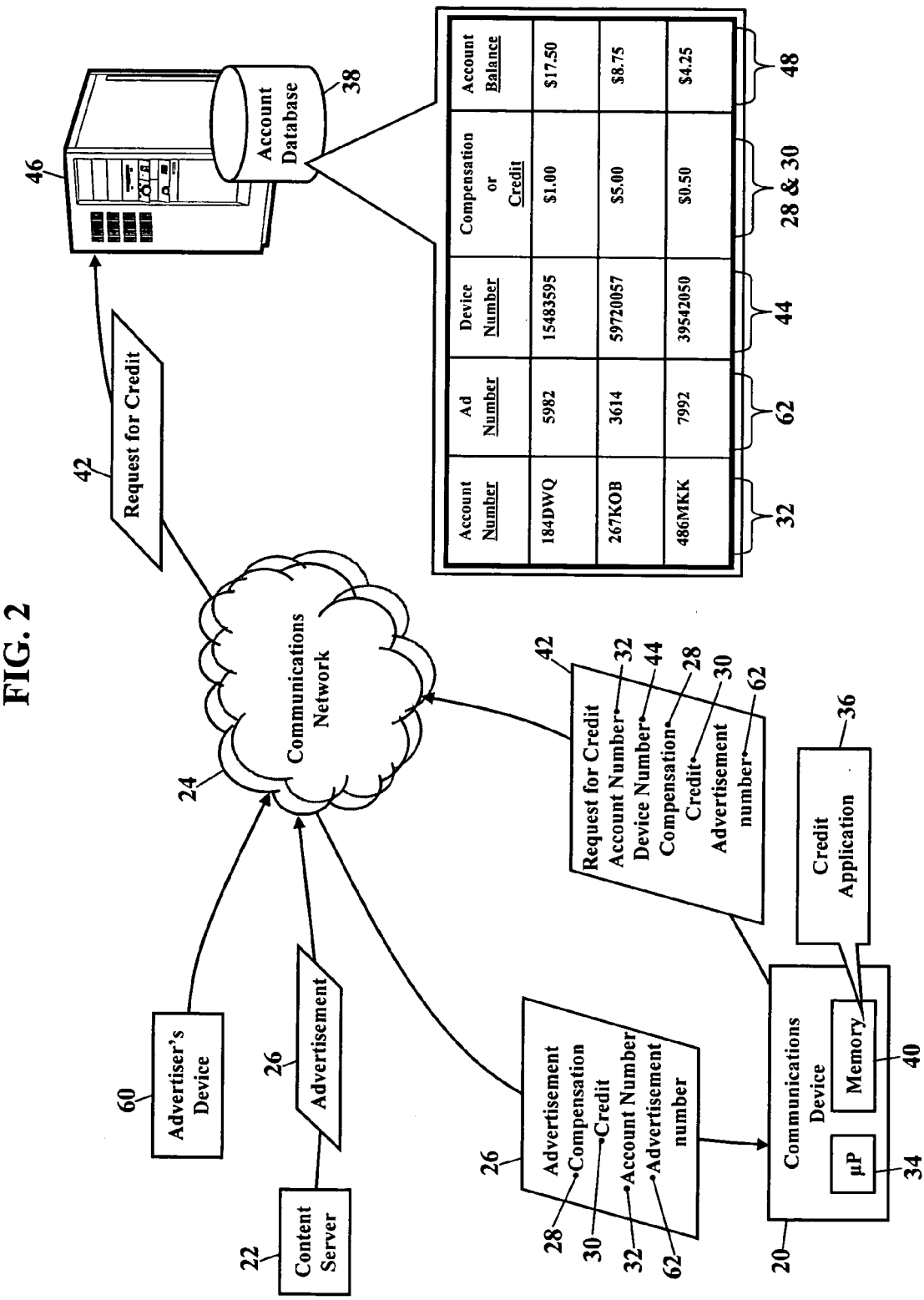
FIGS. 2 and 3 are schematics illustrating an account database, according to more exemplary embodiments.

FIG. 2 is a schematic further illustrating the account database 38, according to more exemplary embodiments. Here the account database 38 may be queried by an advertiser's computer, server, or other device 60. As the account database 38 grows, the account database 38 may store a wealth of advertising information. The account database 38, for example, may log the advertisements processed by each user's communications device. When the user's communications device 20 sends the request 42 for credit, that request 42 may also identify the advertisement 26 experienced by the user. The request 42 for credit, for example, may include an advertisement number 62 that uniquely identifies the advertisement 26. The account database 38, then, may associate the advertisement number 62 with the account number 32, with the device number 44, with the compensation 28 and/or the credit 30, and/or with the account balance 48. When the advertiser's device 60 queries the account database 38, the advertiser could retrieve any or all device numbers that viewed a particular advertisement (e.g., the advertisement number 62). Advertisers could thus identify all user devices that responded to the advertisement. Additonal advertisements could then be targeted to devices, based on similar characteristics to advertisements logged in the account database 38. The account database 38 may even log a date/time when each advertisement was experienced. The account database 38 may thus be queried when targeting advertisements to device numbers.

Figure 3:
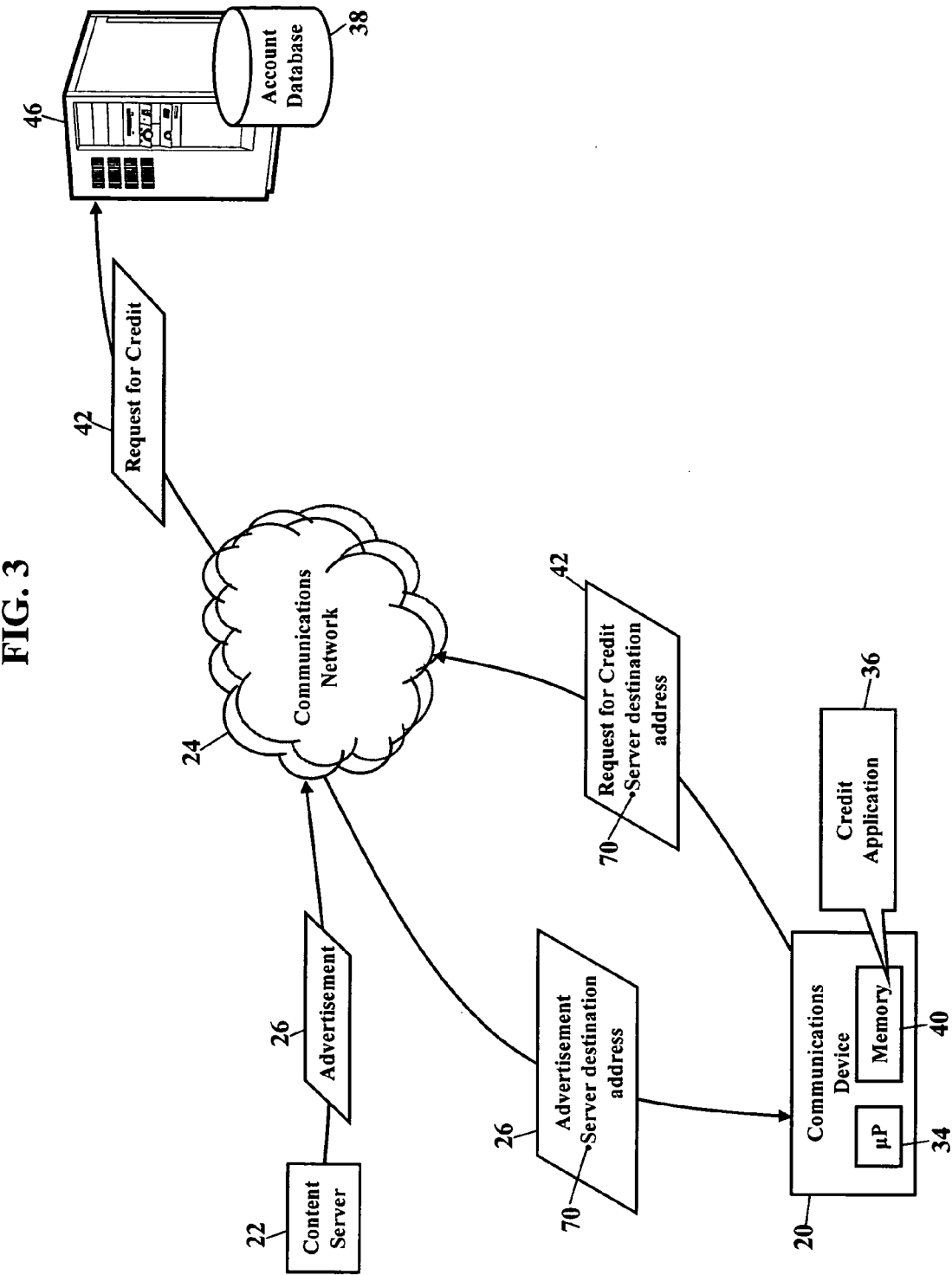

FIG. 3 is a schematic further illustrating the account database 38, according to yet exemplary embodiments. Here the account server 46, and thus the account database 38, is identified by a server destination address 70. When the user's communications device 20 receives the advertisement 26, the advertisement 26 may include the server destination address 70 for the account server 46. The advertisement 26, then, identifies a communications address to which the request 42 for credit is routed. The server destination address 70 may further include a file destination, further identifying the account database 38. Here, then, each advertisement may be associated with its own account database. A frequent advertiser, such as KRAFT FOODS®, for example, may maintain its own account database. Whenever an advertisement for a KRAFT FOODS® product offers compensation for experiencing the advertisement, that advertisement may identify the server destination address 70 for its associated account database. An advertiser may even establish a unique account database for each advertisement. However the account database 38 is established, each advertisement 26 may identify the server destination address 70 for the account database 38. When the credit application 36 sends the request 42 for credit, the request 42 for credit may be sent to the server destination address 70 identified in the advertisement 26.

Figure 4:
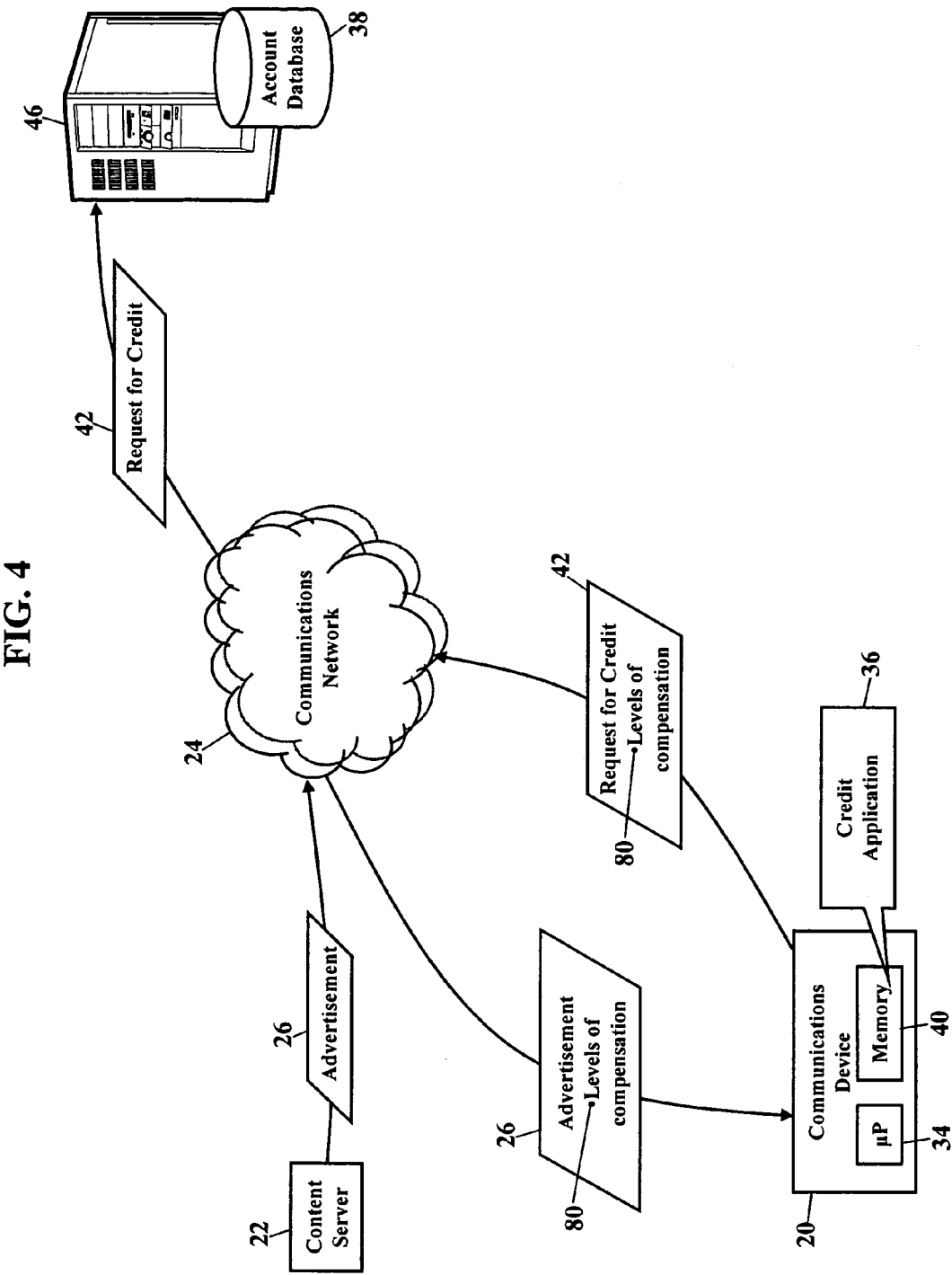
FIG. 4 is a schematic illustrating tiered compensation, according to even more exemplary embodiments.

FIG. 4 is a schematic illustrating tiered compensation, according to even more exemplary embodiments. When the user's communications device 20 receives the advertisement 26, that advertisement 26 may also include tiered compensation. The advertisement 26, for example, may offer various levels 80 of compensation, depending on the user's interaction with the advertisement 26. Perhaps a small credit or reward is offered for simply viewing the advertisement 26. The advertisement 26, however, may offer a greater credit or reward when the user responds to the advertisement. The user, for example, may receive an additional ten (10) reward points for rating the advertisement 26. The advertisement 26 may even offer a larger credit or reward for interacting with the advertisement 26. Perhaps the user may receive a twenty dollar ($20) credit for accepting and completing a survey associated with the advertisement 26. The levels 80 of compensation may include a redeemable coupon, free minutes, or a free product or service. The user may receive the greatest credit or reward for purchasing a product or service promoted by the advertisement 26. Another example may present an icon that prompts the user to hear/see more about an advertised product or service. If the user clicks the icon, thus accepting additional information, the user's communications device 20 could be credited with free airtime minutes, free wireless access, or free service.

Figure 5:
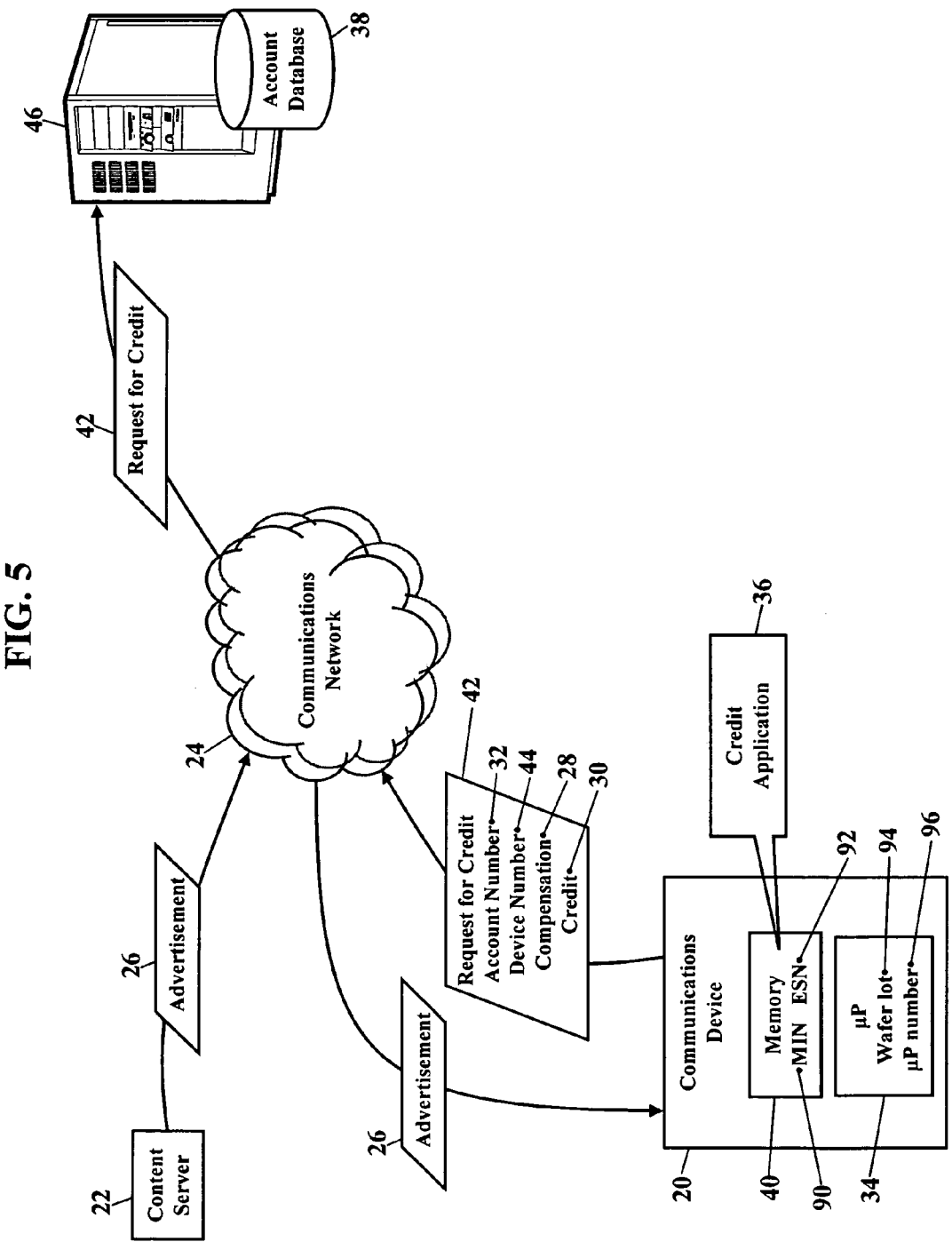
FIG. 5 is a schematic further illustrating a request for credit, according to still more exemplary embodiments.

FIG. 5 is a schematic further illustrating the request 42 for credit, according to still more exemplary embodiments. The credit application 36 instructs the processor 34 to send the request 42 for credit to the account database 38. The request 42 for credit may include the account number 32, the requested compensation 28 or the credit 30, and the device number 44. The account number 32 uniquely identifies an account associated with the advertisement 26. The device number 44 uniquely identifies the user's communications device to which the compensation 28 or credit 30 is applied. The device number 44 is any alphanumeric identifier or code that uniquely identifies the user's communications device 20. The device number 44, for example, may be a Mobile Identification Number (MIN) 90 associated with the user's communications device 20. The device number 44 may additionally or alternatively include a component or device serial number (such as an Electronic Serial Number or "ESN" 92) associated with the user's communications device 20. The device number 44 may additionally or alternatively include a serial number, account number, or any other number that uniquely identifies a Subscriber Identity Module (SIM) associated with the user's communications device 20. The device number 44 may additionally or alternatively include a wafer lot number 94 and/or a processor number 96. The wafer lot number 94 identifies a wafer lot from which the processor 34 was manufactured. The processor number 96 uniquely identifies the processor 34 manufactured from the wafer lot and operating in the user's communications device 20.

Figure 6:
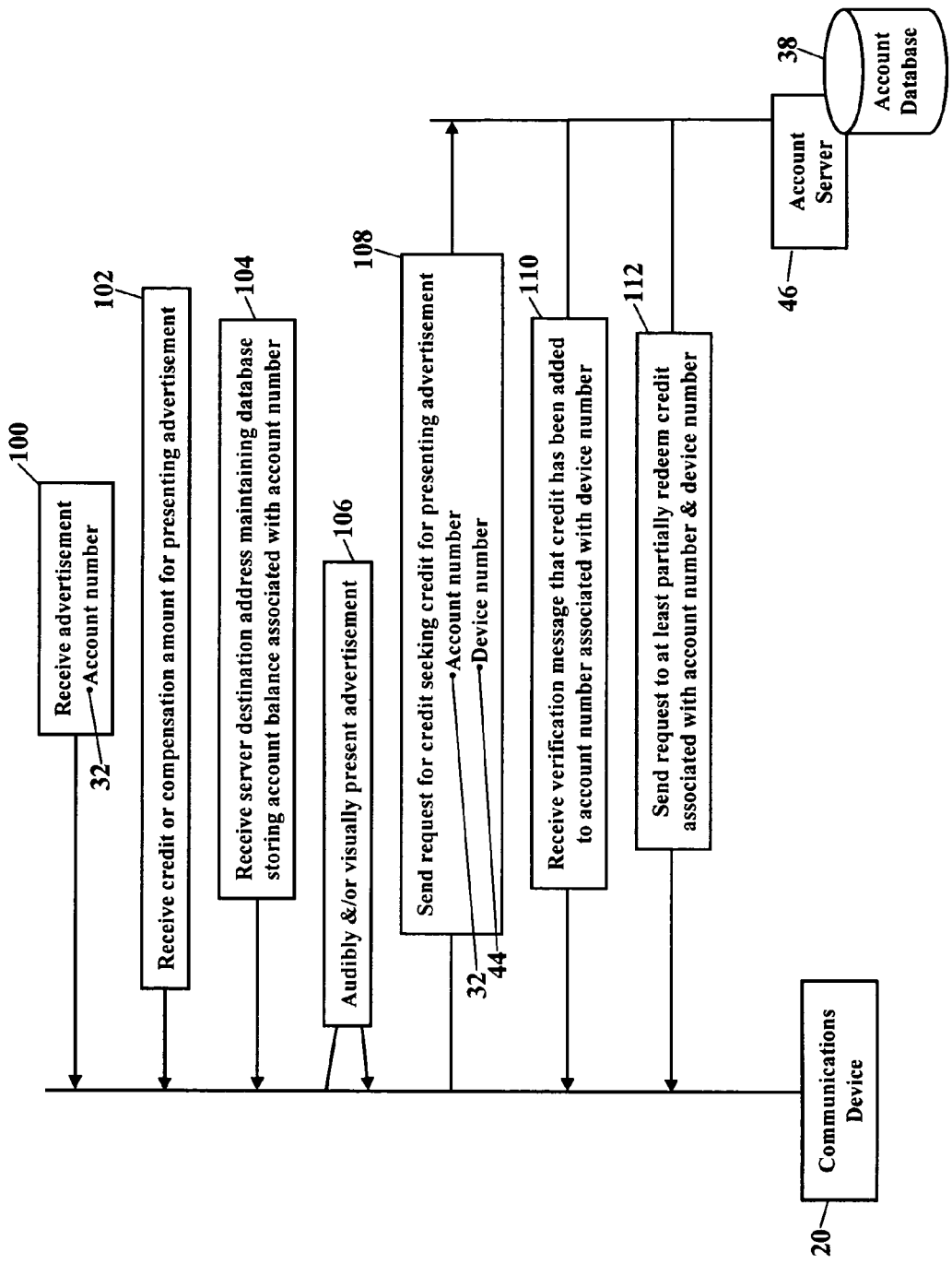
FIG. 6 is a schematic illustrating a process for crediting an account, according to exemplary embodiments.

FIG. 6 is a schematic illustrating a process for crediting an account, according to exemplary embodiments. The user's communications device 20 receives an advertisement comprising the account number that uniquely identifies an account associated with the advertisement (Step 100). The user's communications device 20 may receive a credit amount for viewing, listening to, or otherwise presenting the advertisement (Step 102). The user's communications device 20 may further receive a server destination address that maintains a database storing an account balance associated with the account number (Step 104). The user's communications device 20 audibly and/or visually presents the advertisement (Step 106). A request for credit is sent to the account server 46, and the request seeks credit for presenting the advertisement (Step 108). The request for credit comprises the account number 32 and a device number 44 that uniquely identifies the communications device 20. The account server 22 may send a verification message that the credit has been added to the account number 32 associated with the device number 44 (Step 110). The user's communications device 20 may send another request to at least partially redeem the credit associated with the account number 32 and with the device number 44 (Step 112).

Figure 7:
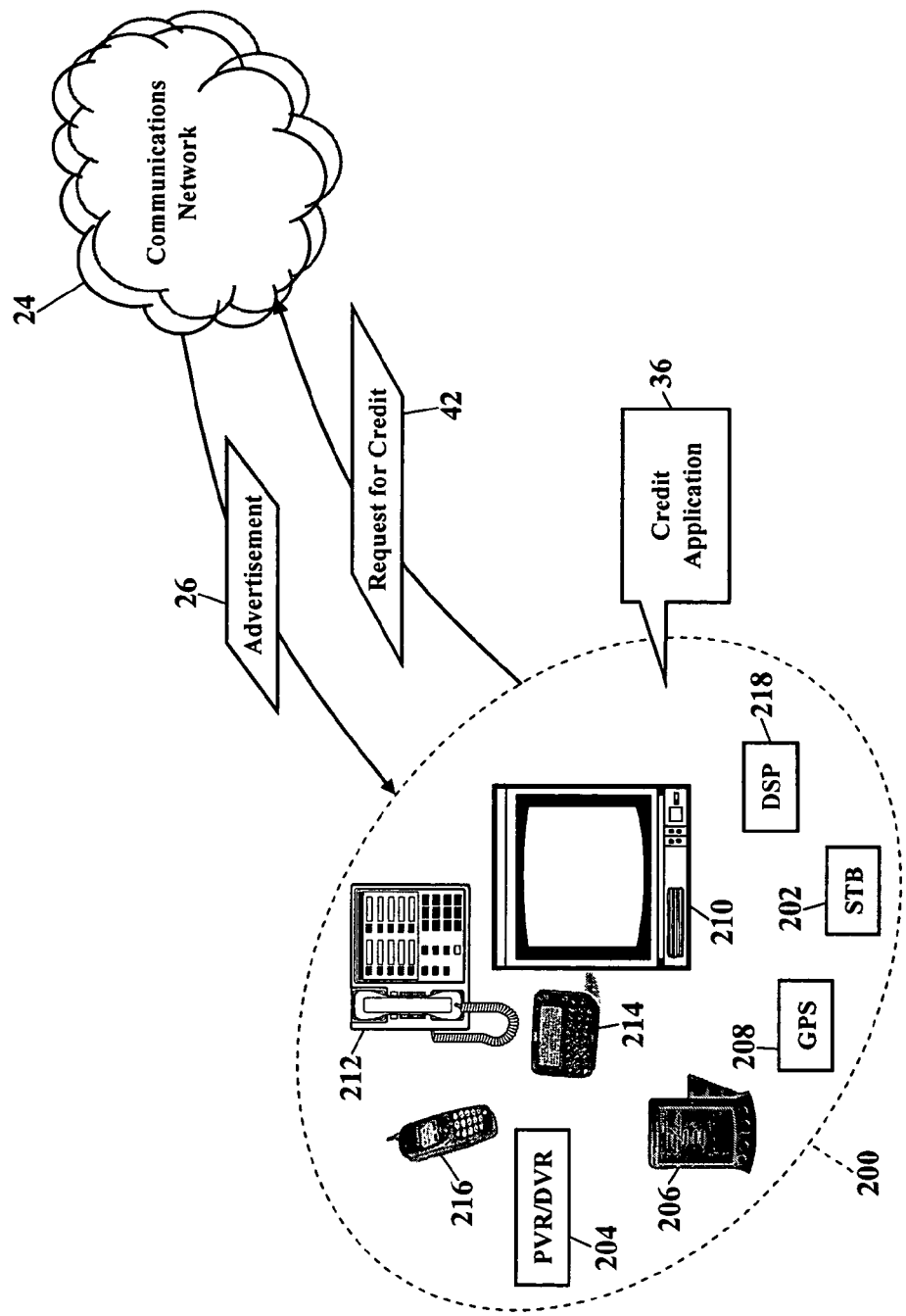
FIG. 7 depicts other possible operating environments, according to more exemplary embodiments.

FIG. 7 depicts other possible operating environments, according to more exemplary embodiments. FIG. 7 illustrates that the credit application 36 may alternatively or additionally operate within various other communications devices 200. FIG. 7, for example, illustrates that the credit application 36 may entirely or partially operate within a set-top box (202), a personal/digital video recorder (PVR/DVR) 204, personal digital assistant (PDA) 206, a Global Positioning System (GPS) device 208, an interactive television 210, an Internet Protocol (IP) phone 212, a pager 214, a cellular/satellite phone 216, or any computer system and/or communications device utilizing a digital signal processor (DSP) 218. The communications device 200 may also include watches, radios, vehicle electronics, clocks, printers, gateways, and other apparatuses and systems. Because the architecture and operating principles of the various communications devices 200 are well known, the hardware and software componentry of the various communications devices 200 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment* (*Subscriber Identity Module—ME*) *interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

The credit application 36 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments, allow the activation application 32 and/or the complementary activation application 50 to be easily disseminated. A computer program product comprises the credit application 36 stored on the computer-readable medium. The credit application 36 comprises computer-readable instructions/code for crediting accounts when advertisements are presented.

Exemplary embodiments may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for crediting an account, comprising:

receiving an advertisement at a communications device, the advertisement comprising an account number that uniquely identifies an account associated with the advertisement;

presenting the advertisement at the communications device; and sending a request for credit comprising the account number and a device number that uniquely identifies the communications device, wherein the request seeks credit for presenting the advertisement.

2. A method according to claim 1, wherein the step of receiving the advertisement further comprises receiving a credit that will be credited to the device number when the advertisement is presented.

3. A method according to claim 1, wherein the step of receiving the advertisement further comprises receiving a server destination address that maintains a database storing an account balance associated with the account number and with the device number.

4. A method according to claim 1, further comprising the step of receiving a verification message that a credit has been added to the account number associated with the device number.

5. A method according to claim 1, further comprising the step of sending another request to redeem credit associated with the account number and with the device number.

6. A method according to claim 1, further comprising at least one of i) audibly presenting the advertisement and ii) visually presenting the advertisement.

7. A method according to claim 1, wherein the step of sending the request for credit comprises sending a wafer lot number and a microprocessor number associated with the communications device, the wafer lot number identifying a wafer lot from which a microprocessor was manufactured, and the microprocessor number uniquely identifying the microprocessor manufactured from the wafer lot and operating in the communications device that sends the request.

8. A system, comprising:

a credit application stored in memory; and a processor communicating with the memory, the processor receiving an advertisement at a communications device, the advertisement comprising an account number that uniquely identifies an account associated with the advertisement, the processor presenting the advertisement at the communications device, and the processor sending a request for credit comprising the account number and a device number that uniquely identifies the communications device, wherein the request seeks credit for presenting the advertisement.

9. A system according to claim 8, wherein the processor receives a credit that will be credited to the device number when the advertisement is presented.

10. A system according to claim 8, wherein the processor receives a server destination address that maintains a database storing an account balance associated with the account number and with the device number.

11. A system according to claim 8, wherein the processor receives a verification message that a credit has been added to the account number associated with the device number.

12. A system according to claim 8, wherein the processor sends another request to redeem credit associated with the account number and with the device number.

13. A system according to claim 8, wherein the processor at least one of i) audibly presents the advertisement and ii) visually presents the advertisement.

14. A system according to claim 8, wherein the processor sends a wafer lot number and a processor number associated with the communications device, the wafer lot number identifying a wafer lot from which the processor was manufactured, and the processor number uniquely identifying the processor manufactured from the wafer lot and operating in the communications device that sends the request.

15. A computer program product storing computer code for performing the steps:

receiving an advertisement at a communications device, the advertisement comprising an account number that uniquely identifies an account associated with the advertisement;

presenting the advertisement at the communications device; and sending a request for credit comprising the account number and a device number that uniquely identifies the communications device, wherein the request seeks credit for presenting the advertisement.

16. A computer program product according to claim 15, further comprising computer code for receiving a credit that will be credited to the device number when the advertisement is presented.

17. A computer program product according to claim 15, further comprising computer code for receiving a server destination address that maintains a database storing an account balance associated with the account number and with the device number.

18. A computer program product according to claim 15, further comprising computer code for receiving a verification message that a credit has been added to the account number associated with the device number.

19. A computer program product according to claim 15, further comprising computer code for sending another request to redeem credit associated with the account number and with the device number.

20. A computer program product according to claim 15, further comprising computer code for sending a wafer lot number and a microprocessor number associated with the communications device, the wafer lot number identifying a wafer lot from which a microprocessor was manufactured, and the microprocessor number uniquely identifying the microprocessor manufactured from the wafer lot and operating in the communications device that sends the request.

* * * * *